Feb. 8, 1966  P. F. M. JOLIVET ETAL  3,233,649
HIGH SPEED TIRE
Filed Oct. 25, 1963  2 Sheets-Sheet 2

United States Patent Office 3,233,649
Patented Feb. 8, 1966

3,233,649
HIGH SPEED TIRE
Pierre Francois Marie Joseph Jolivet and Georges Edouard Yvon Caille, Colombes, and Jean-Francis Olagnier, Levallois, France, assignors to Pneumatiques, Caoutchouc Manufacture et Plastiques Kleber Colombes, Paris, France, a corporation of France
Filed Oct. 25, 1963, Ser. No. 318,923
Claims priority, application France, Oct. 31, 1962, 914,138, Patent 1,349,247
7 Claims. (Cl. 152—361)

This invention relates to a pneumatic tire for fast moving vehicles and, in particular, to a tire for airplanes which land and take-off at speeds of 300 or more kilometers per hour.

Pneumatic tires for airplanes which land at high speeds present problems which are quite unique and which generally prevent the use, without modification, of constructions utilized for vehicles which operate upon highways. In particular, the intensity of the centrifugal force to which the periphery of the tire is subjected as it runs at high speed tends to separate the tread from the carcass and may even cause pieces of the tread to break off. Also, the tangential component of the shock which occurs on landing as the wheel passes instantaneously from a state of rest to rotation at a very high rate of speed gives rise to stresses which are not comparable with those to which tires for highway vehicles are subjected. Moreover, the shock on landing often completely crushes the tire between the wheel and the ground. Furthermore, due to the inertia of the tire materials and in spite of the elasticity thereof, the deformations therein when the tire contacts the ground do not have time to be reabsorbed on each rotation of the wheel. This imparts an undulating shape to the periphery of the tire which soon causes its destruction.

These unique problems have led some inventors to effect modification of conventional bias fabric reinforced carcass tires for the purpose of rendering them capable of undergoing the very severe conditions of landing at high speeds. In particular, U.S. Patent 2,943,663, issued July 5, 1960, discloses the reinforcement of the tread of a pneumatic tire of conventional bias fabric reinforced carcass type with cord fabric layers distributed within the tread in radially spaced relationship in a manner such as to vary the elasticity of the tread and thus increase its resistance to deformation at high speeds. Airplane tires which have been manufactured in accordance with the disclosures of this patent do give remarkable results both with respect to their resistance to failure and their retention of the tread at high speeds.

Efforts to further improve tires for high-speed aircraft have led to proposals for use of the so-called radial carcass pneumatic tires which are now well-known and currently used for vehicles operated upon highways. In such a tire, the carcass is constituted by radial cords running in arcs from one bead to the other and is surmounted by an inextensible breaker layer which is circumferentially tensioned by the inflation pressure thereby providing the tire with good radial stability when it moves over the ground.

Among other advantages, pneumatic tires of the radial carcass type wear less rapidly than tires in which the carcass is reinforced by bias fabric and, in addition, requisite strength can be achieved without undue stiffening of the carcass sidewalls. Hence, such tires have naturally suggested themselves for use on airplanes wherein tires generally undergo very rapid wear by reason of the high-speed landings and take-offs. However, attempts made in this direction have not heretofore produced good results. In particular, when tires of this type are submitted to the effects of high landing and take-off speeds, separation soon occurs at the edges of the breaker thus putting the tires out of service.

The principal object of this invention is, therefore, an improved construction for pneumatic tires intended for use on high-speed airplanes, which construction incorporates both the resistance to tread separation and the improved tread wear which heretofore were only separately achieved.

This object is achieved by a construction in which the tire carcass is reinforced by radially extended cords and the tread is reinforced by bias-laid cord fabric, the latter term being used as inclusive of both woven and weftless materials in which the reinforcing elements are formed of textile fibers, wire, or combinations thereof. By means of this combination of two means, each known per se, it is possible to secure quite remarkable results due chiefly to the fact that the cord fabric layers which reinforce the tread not only perform their known function of reinforcement in resistance to the centrifugal forces and circumferential deformations at high speeds but also complete, and in some cases replace, the action of the breaker layer upon the radial carcass, of increasing resistance to wear and increasing the lateral stability of the tire. Consequently, a pneumatic tire in accordance with this invention may have a breaker layer which is substantially inextensible in the longitudinal direction and located between the top of the carcass and the tread with the latter reinforced by spaced layers of cord fabric. It is also possible for the improved tire not to have a separate breaker in which case the cord fabric layers incorporated in the tread are substantially inextensible and arranged in such a manner as to be tensioned by the inflation pressure and thereby act as both tread reinforcement and breaker layers.

Other advantages arising from the improved construction will be evident from the following description of the presently preferred embodiment, and certain modifications thereof, described with reference to the accompanying drawings, forming a part of this application, and in which.

Figure 1:
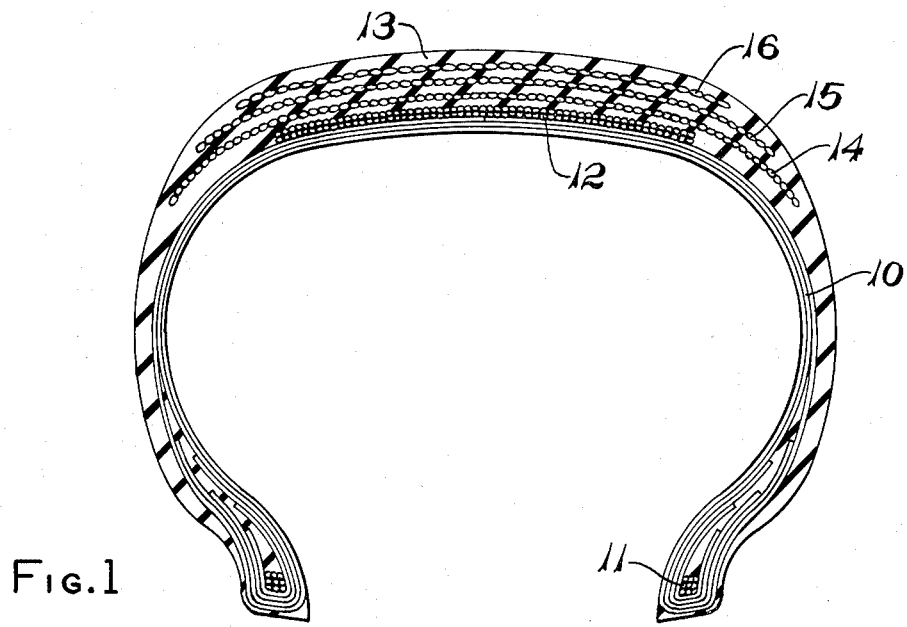
FIG. 1 is a transverse sectional view of the presently preferred embodiment of a pneumatic tire made in accordance with the invention and including both a breaker layer and tread reinforcing fabric.

In the embodiment of the invention illustrated in FIG. 1, the tire comprises a carcass 10 formed by one or more superposed layers of cord fabric, which may be weftless or provided with only a very light weft in known manner, with the cords extending parallel and embedded in a thin layer of rubber. The carcass cords or cables are oriented in directions passing through radial or meridian planes with the edges of the layers turned about bead cores 11. The number of layers of cords in the carcass 10 is a function of the size of the tires and the desired strength as well as the size of the cords and the materials from which they are made. The invention is not limited to use of any particular material for these cords nor the number of layers employed in the carcass.

The carcass 10 is surmounted by a breaker 12 which is substantially inextensible in the circumferential direction and more or less rigid in its plane. This breaker may be formed of an even number of superposed layers of cord fabric approximately as wide as the running surface of the tread with the cords of these layers extending parallel to each other and disposed at a very slight angle, for example, at an angle between 0 and 20° with respect to the mid-circumferential plane of the tire and with the cords in one layer disposed in the reverse sense to those of the other layer. The invention is not limited, however, to use in the breaker of an even number of reinforcing layers since other breaker constructions, known in prior radial cord constructions, may be employed. The breaker 12, regardless of its specific form, has a length such that it prevents radial expansion of the carcass 10 and flattens the top thereof so that the breaker is tensioned by the inflation pressure.

The carcass 10 and the breaker 12 of the tire are surmounted by the tread 13 comprising elastomer in which a plurality of cord fabric reinforcement layers 14, 15 and 16 are embedded in radially spaced relationship. These fabric layers are so arranged as to modify the elasticity of the tread and provide a transition thereof from the essentially circumferential inextensibility of the overhead 12 to the much greater extensibility of the surface of the tread 13 which is determined by the composition of the elastomer employed therein. This variation in elasticity may be modified to provide the requisite gradation by varying the number of fabric layers, by varying the radial spacing between the layers themselves, and/or the radial spacing between the layers and the carcass and between the layers and the surface of the tread. Thus, the spacing intervals may be of the same size or may be progressively of different size. In addition to varying the number and spacing of the reinforcement layers in the tread, variation in the elasticity may be achieved by varying the angles of the cords in the layers relative to the mid-circumferential plane with this angle being preferably greater for the layer adjacent the surface of the tread than for the layer adjacent the breaker. For example, the cords in the layer 14 may have an angle of 20°, those in the layer 15 an angle of 25° and the cords in the layer 16 and angle of 30°. It is, however, advantageous for the angle included between the cords of the reinforcing layers and the circumferential plane of the tire to be small and preferably less than 45° so that the tread reinforcing layers impart a certain longitudinal inextensibility to the tread assembly with the result that this inextensibility completes the action of the breaker 12 in increasing the resistance to wear of the tire and also increasing its radial stability.

It will be observed from FIG. 1 that the width of each of the cord fabric tread reinforcements is greater than that of the breaker layer 12 so that the said reinforcements project over the latter at each side, the edges of the inner layer 14 being applied either directly on or very close to the carcass 10 in the zone of the shoulders of the tire. The effect of this arrangement is to hold and protect the edges of the breaker 12 and, consequently, eliminate the risk of loosening of the breaker in this zone. The width of the tread reinforcement layers decreases progressively in the radially outward direction so that the locations at which the edges of the outer layers terminate in the vicinity of the shoulders of the tire are progressively spaced.

Figure 2:
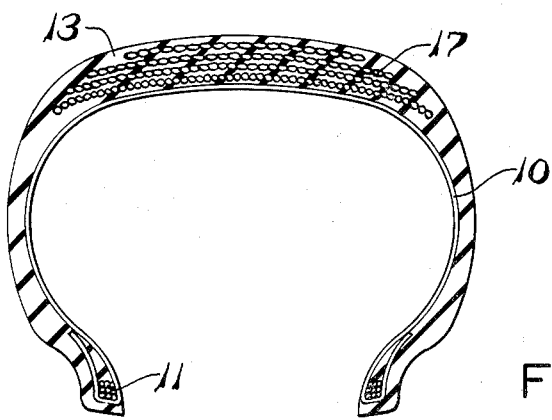
FIG. 2 is a transverse section similar to FIG. 1 illustrating a modified construction in which the tread reinforcing fabric functions also as an inextensible breaker.

The embodiment of the invention illustrated in FIG. 2 does not have a separate breaker similar to the breaker 12 of FIG. 1. Instead, the radial carcass 10 is stressed and flattened at its crown by the assembly of the tread reinforcing cord fabric layers 17 distributed within the tread 13. Hence, the assembly of tread reinforcements is substantially inextensible in the circumferential direction and is tensioned by the inflation pressure of the tire under conditions similar to those existing where a separate breaker layer is present. In the instant embodiment, it is necessary, therefore, to employ for the cords, in at least some of the tread layers, a direction which forms only a small angle with the mid-circumferential plane of the tire. The angles of the cords in other layers may still vary progressively as described above. It may also be necessary in this embodiment to increase the number of reinforcing layers 17 and correspondingly reduce the radial spacing between them and to include an even number of the layers in which the angles of the cords are symmetrically oriented with respect to the mid-circumferential plane. Hence, in this construction, the reinforcement layers 17 act as a breaker layer while continuing to fulfill their function of tread reinforcement with regard to circumferential forces and deformations which occur at high speed.

Figure 3:
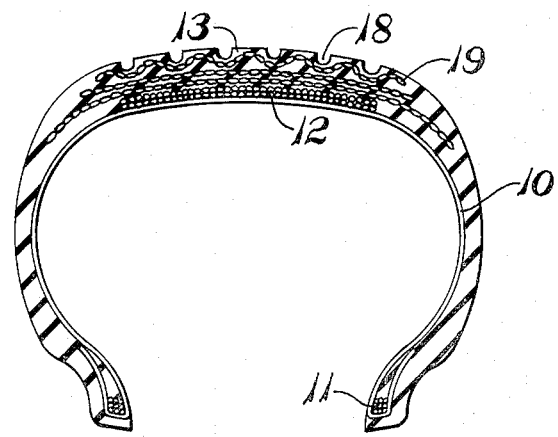
FIG. 3 is a transverse sectional view similar to FIG. 1 illustrating the invention as applied to a tire with a ribbed tread.

The embodiment of the invention illustrated in FIG. 3 has the tread surface of the tire provided with circumferential grooves 18 which may be either parallel with the circumferential plane of the tire or zigzag. These grooves form intervening ribs of corresponding shape and, in this case, it is preferable for the outermost tread reinforcement fabric layer 19 to extend into the ribs, as illustrated, to thereby anchor the ribs to the main body of the tread.

Figure 4:
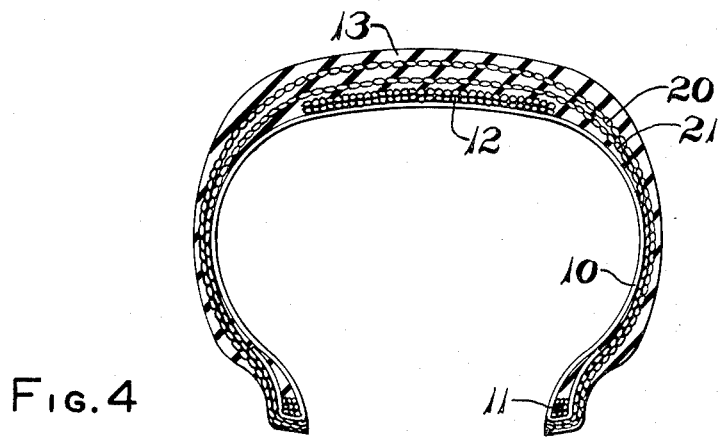
FIG. 4 is a transverse section through another modification in which the tread reinforcing fabric extends to the bead regions of the tire.

The embodiment illustrated in FIG. 4 has the cord fabric tread reinforcement layers 20 and 21 extended on each side of the carcass to the inner tips or edges of the beads which are commonly known as the bead toes. This construction is particularly advantageous for tires which are intended to operate at exceptionally high speeds. It is also possible to provide, in addition to the reinforcing layers 20, 21, supplementary cord fabric layers running alternately from one layer to the other to connect them at various loctions. In the illustrated embodiment, it is preferable to employ extensible materials, such as nylon, for the layers 20 and 21, or to orient the cords of such layers in a meridian or substantially meridian plane so as not to interfere with the flexibility of the radial carcass. On the other hand, it is possible to employ in the tread reinforcing layers the cords of relatively low extensibility and oriented at an incline to the mid-circumferential plane by widely spacing the cords from one anothter so as to form a large mesh structure. This will effect a retaining action on the rubber without deleteriously affecting the flexibility of the radial carcass.

Figure 5:
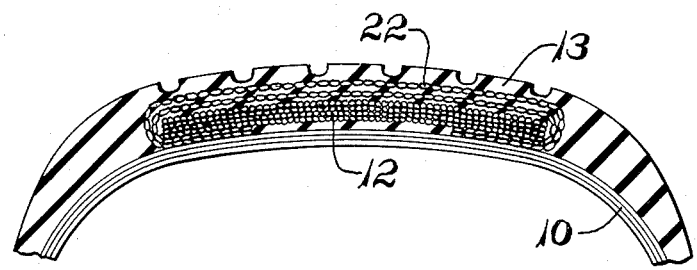
FIG. 5 is a fragmentary transverse sectional view through the crown of a pneumatic tire showing a modification of the invention in which the ends of the tread reinforcing fabric are turned beneath the edges of the overhead.

FIG. 5 illustrates another embodiment of the invention in which the tread 13 is reinforced by two cord fabric layers 22, the edges of which are curved down around the edges of the breaker layer 12. In this embodiment, the edges of the layers 22 are either turned inwardly between the carcass and the edges of the breaker, as shown, or may be inserted between the layers of cords constituting the breaker. This embodiment provides improved adherence at the edges of the breaker.

Figure 6:
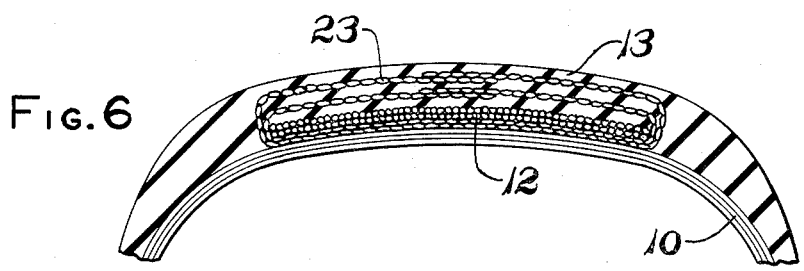
FIG. 6 is a view similar to FIG. 5 illustrating a further modification in which the edges of the overhead layers serve also as tread reinforcement layers.

The embodiment shown in FIG. 6 has the tread reinforcements 23 provided by folding the side edges of one or more of the layers constituting the breaker 12 parallel to the breaker but radially spaced therefrom by intervening layers of rubber. Hence, the folded edges are generally parallel to the tread surface and are radially spaced therefrom and from the main body of the overhead to provide the required tread reinforcement. The edges of the tread reinforcement thus formed may overlap to a greater or lesser extent in the central portion of the tire.

Figure 7:
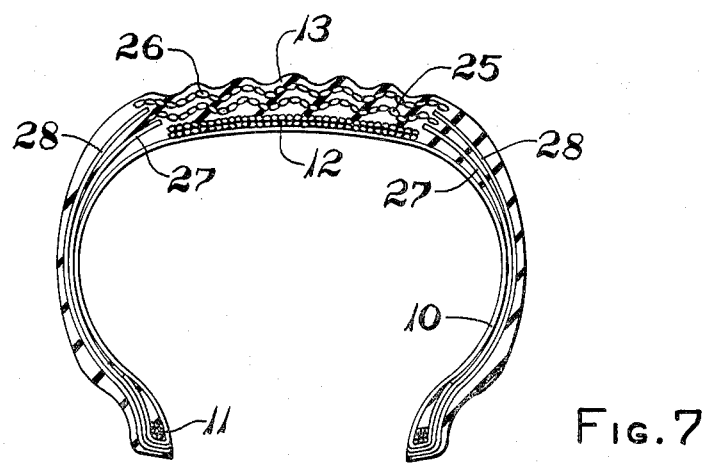
FIG. 7 is a view similar to FIG. 3 showing a further modification in which the tread reinforcing fabric layers are interposed with sidewall reinforcements in the shoulder of the tire.

FIG. 7 illustrates an embodiment somewhat similar to that in FIG. 4 but having tread reinforcement layers 25 and 26 distinct from the cord fabric layers 27, 28 placed in the sidewalls. The fabric layers 25, 26 in the tread may have the cords thereof arranged at bias angles so that they cross at an angle which may be either large or small depending upon the degree of inextensibility required. The cords in the fabric layers 27 and 28 are, however, oriented substantaially in radial planes. The two series of fabric layers 25, 26 and 27, 28 preferably have their adjacent edges interfitted in the shoulder regions of the tire to distribute the forces which are to be sustained.

The several embodiments of the invention described may have the cord reinforced fabric for the tread formed in the usual manner in which tire ply stock is prepared, utilizing textile cords of nylon, rayon, polyester or other artificial filaments. They may also be constituted by monofilaments or tapes of like materials. Likewise, the carcass and overhead cords may be of any appropriate material which may be the same as or different from that employed for the tread reinforcements. When a high rate of heat dissipation is desired, the reinforcements may be made of metal; for example, cords of steel, aluminum or various alloys may be utilized in one or more of the carcass, overhead and tread. The elastomers employed for the carcass and tread may be any of those presently known as suitable for use in airplane tires and the tire may be made for use either with an inner tube or may be of the tubeless type. The selection of the appropriate materials and variants of the invention, which are readily understood by those skilled in the art, are all considered as encompassed in the ambit of the invention, the scope of which is defined by the appended claims.

Having thus described the invention, we claim:

1. A pneumatic tire for vehicles adapted to operate at high speeds comprising a cord reinforced elastomer carcass with the reinforcing cords arranged in meridian planes of the tire, a substantially circumferentially inextensible breaker on the crown of the carcass to prevent radial expansion of the carcass and resist circumferential deformations, said breaker being substantially as wide as the running surface of the tire, and a tread including a plurality of superposed layers of tread elastomer and of cord fabric in alternated relationship so that the cord fabric layers are radially spaced within said tread elastomer to provide a radial gradation in circumferential extensibility thereof from said breaker to the running surface of the tire and thereby increase the tread resistance to deformations at high speeds.

2. A tire as defined in claim 1 wherein the orientation of the cords of the fabric layers within the tread is such that these cords in the radially outer layer make a larger angle with the mid-circumferential plane of the tire than the cords in the radially inner layer.

3. A tire as defined in claim 1 wherein the width of the cord fabric layers of the tread is greater than the width of the breaker so that the former project beyond the latter on either side.

4. A tire as defined in claim 1 wherein the radial edges of the cord fabric layers are folded back around the edges of the breaker.

5. A tire as defined in claim 1 wherein the side edges of one or more of the said cord fabric layers extend to the bead toes of the tire.

6. A tire as defined in claim 1 wherein the side edges of the cord fabric layers in the tread are extended to the shoulders of the tire.

7. A pneumatic tire for airplanes which take off and land at speeds in the order of 300 kilometers per hour comprising a cord reinforced elastomer carcass the reinforcing cords of which extend in meridian planes of the tire, a circumferentially inextensible breaker on the crown of the carcass, said breaker being substantially as wide as the running surface of the tire, and a tread of laminated structure consisting of a plurality of superposed layers of tread elastomer and of cord fabric in alternated relationship, the inner cord fabric layer being radially outwardly spaced from the breaker by a layer of tread elastomer, the said cord fabric having the cords thereof disposed obliquely relative to the circumferental mid-plane of the tire with the edges of the said cord fabric extending laterally beyond the edges of the breaker.

References Cited by the Examiner
UNITED STATES PATENTS

| | | | |
|---|---|---|---|
| 2,884,040 | 4/1959 | Boussu et al. | 152—361 X |
| 2,943,663 | 7/1960 | Antonson | 152—361 X |
| 3,081,811 | 3/1963 | Beckadolph | 152—361 X |
| 3,131,744 | 5/1964 | Boussu et al. | 152—361 |

ARTHUR L. LA POINT, *Primary Examiner.*